(12) United States Patent
Grann et al.

(10) Patent No.: US 8,807,920 B2
(45) Date of Patent: Aug. 19, 2014

(54) PUMP ASSEMBLY

(75) Inventors: Helge Grann, Bjerringbro (DK); Alfred Lisbjerg Pedersen, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 1017 days.

(21) Appl. No.: 12/739,997

(22) PCT Filed: Oct. 18, 2008

(86) PCT No.: PCT/EP2008/008839
§ 371 (c)(1),
(2), (4) Date: Apr. 27, 2010

(87) PCT Pub. No.: WO2009/056242
PCT Pub. Date: May 7, 2009

(65) Prior Publication Data
US 2011/0223009 A1    Sep. 15, 2011

(30) Foreign Application Priority Data
Oct. 29, 2007    (EP) ...................................... 07021115

(51) Int. Cl.
*F04D 29/047*    (2006.01)

(52) U.S. Cl.
USPC ........... 415/104; 415/107; 415/111; 415/180; 415/229; 417/420; 417/423.12; 384/275; 384/276; 384/303; 384/304; 384/420; 384/624

(58) Field of Classification Search
USPC ................. 415/104, 106, 107, 111, 113, 180, 415/229–231; 416/174; 417/420, 423.12, 417/423.13, 423.1; 384/275, 276, 302, 303, 384/304, 420, 624
See application file for complete search history.

(56) References Cited

U.S. PATENT DOCUMENTS

| | | | | |
|---|---|---|---|---|
| 1,207,071 A | * | 12/1916 | Parsons | 384/306 |
| 3,161,446 A | * | 12/1964 | Love | 384/303 |
| 4,764,034 A | | 8/1988 | Fust et al. | |
| 5,302,091 A | * | 4/1994 | Horiuchi | 417/420 |
| 6,056,520 A | * | 5/2000 | Nguyen et al. | 417/420 |
| 6,287,074 B1 | * | 9/2001 | Chancellor | 415/231 |

FOREIGN PATENT DOCUMENTS

| | | |
|---|---|---|
| DE | 200 07 841 U1 | 9/2000 |
| EP | 0 272 442 A2 | 6/1988 |
| EP | 0 431 332 A2 | 6/1991 |
| EP | 0 771 957 A1 | 5/1997 |
| JP | 2007-270931 A | 10/2007 |
| WO | 98/05890 A1 | 2/1998 |

OTHER PUBLICATIONS

English translation of EP 0 771 957, available from the European Patent Office, May 7, 1997.*

* cited by examiner

*Primary Examiner* — Christopher Verdier
(74) *Attorney, Agent, or Firm* — Panitch Schwarze Belisario & Nadel LLP

(57) ABSTRACT

A pump assembly with a rotatable rotor shaft (10), wherein the rotor shaft (10) includes at least one axial bearing (36, 40) and a radial bearing (30, 32), which are integrated into a common bearing assembly (16).

14 Claims, 3 Drawing Sheets

PUMP ASSEMBLY

CROSS-REFERENCE TO RELATED APPLICATIONS

This application is a Section 371 of International Application No. PCT/EP2008/008839, filed Oct. 18, 2008, which was published in the German language on May 7, 2009, under International Publication No. WO 2009/056242 A1 and the disclosure of which is incorporated herein by reference.

BACKGROUND OF THE INVENTION

The present invention relates to a pump assembly, and in particular to a bearing arrangement in a pump assembly.

Pump assemblies usually comprise a drive device, for example an electric motor, a rotor shaft and an impeller arranged thereon. The rotor shaft thereby, must be mounted in the axial and radial direction. In particular, the pressure forces acting on the impeller on operation of the pump must be accommodated in the axial direction. For this, with regard to pumps with canned motors or magnet couplings with cans in the drive unit, usually a bearing is arranged at the axial end of the rotor shaft in the can. The problem with this mounting is the bearing may often not be adequately cooled or lubricated.

Furthermore, with multi-stage pumps, it is a problem that the tolerances in each pump stage sum, so that on assembly, it is necessary to position the pump impellers relative to the rotor shaft, or to provide an axial compensation in the coupling between the drive motor and the rotor shaft.

BRIEF SUMMARY OF THE INVENTION

It is the object of the present invention to provide a pump assembly which has an improved mounting, which has a minimised number of individual parts, is easier to assemble, and furthermore permits an improved lubrication or cooling.

The above object is achieved by a pump assembly with the features specified in the independent claim of the present application. Preferred embodiments are to be deduced from the dependent claims, the subsequent description as well as the attached figures.

The pump assembly according to the present invention, in the known manner, comprises a rotatable rotor shaft. This rotor shaft, on the one hand is connected to a drive device, for example an electric motor or a magnet drive, and on the other hand to at least one impeller. The rotor shaft may be designed as one piece with the rotor shaft of an electric motor, or may be combined with a coupling, for example a magnet coupling, which transmits the torque from the drive motor onto the rotor shaft.

The present invention relates to a new type of bearing arrangement for the rotor shaft. According to the present invention, at least one axial bearing and one radial bearing are provided for the rotor shaft. These, according to the present invention, are thereby integrated into a bearing assembly. This results in the axial and the radial mounting being able to be effected at one location on the rotor shaft. Thus, the bearings are concentrated at one location, which simplifies the lubrication and cooling.

The bearing assembly comprises a bearing ring, whose inner peripheral surface or whose outer peripheral surface forms a radial bearing surface, and whose end-faces on the axial side form two axial bearing surfaces acting in opposite directions. The bearing ring thus forms a central bearing component, which simultaneously assumes the function of a radial mounting and of an axial mounting. Thereby, it assumes the function of the axial mounting in both axial directions. On operation of the pump, however, usually only an axial force in a defined direction acts in the axial direction onto the rotor shaft, and this axial force must be accommodated by the axial bearing. Forces only act in the opposite direction on starting operation the pump, or in the case of a fault. Inasmuch as this is concerned, a bearing which is required for this may be dimensioned more weakly, since it only needs to form a starting operation bearing or emergency bearing. The number of necessary individual parts in the bearing assembly is minimised by way of the use of the bearing ring as a central bearing component. Thus, the cylindrical inner peripheral surface or the cylindrical outer peripheral surface of the bearing ring serves for the radial mounting. The end-faces normal to these cylindrical inner peripheral surfaces and outer peripheral surfaces serve as axial bearing surfaces. The bearing surfaces, i.e. the axial bearing surfaces as well as the radial bearing surfaces, preferably form parts of sliding bearings, i.e. these surfaces slidingly engage with respective oppositely lying bearing elements for the transmission of force. Thereby, a lubrication is preferably effected by the fluid to be delivered by the pump. The bearing ring is preferably manufactured of a hard material or has suitably hard surface coatings at least at the surfaces serving as bearing surfaces.

The bearing ring is preferably arranged in a bearing housing. This bearing housing may then be integrated into a pump housing and thus simplifies the assembly, since the whole bearing housing may be assembled in one assembly step, by which means one may simultaneously assemble axial bearings and radial bearings. Furthermore, the bearing housing may be designed or arranged such that an adjustment or alignment of the position of the complete bearing housing in the pump assembly or the pump housing is possible, for example in order to compensate tolerances in the pump stages, and to position the rotor shaft which is mounted in the bearings in the bearing housing, at a defined location in the pump assembly. Thus, the rotor shaft may always be positioned correctly with regard to the drive device, for example a magnet coupling.

The bearing assembly is preferably arranged distanced to the axial ends of the rotor shaft in the axial direction. The mounting of the rotor shaft in the axial as well as the radial direction is thus effected in the central region and not at the axial ends. Thus, one may do away with a mounting at the axial end of the rotor shaft, in particular at the axial end situated in a can. Thus, the bearings at the base of the canned pot of a canned pump, which are difficult to cool and lubricate, are done away with. The more central arrangement of the bearings in the pump assembly permits an improved cooling and lubrication, since the bearings may be arranged closer to the impeller of the pump and thus to the fluid flow. It is thus easier to lead a part of the fluid flow through the bearing for its cooling and lubrication.

Particularly preferably, the bearing assembly, seen in the axial direction, i.e. seen in the direction of the rotor shaft, is arranged between at least one impeller and a drive device of the pump assembly. With regard to the drive device, it is thereby the case e.g. of an electric motor or a magnet coupling, which creates the connection to the actual drive. Thus, the bearing assembly lies closer to the impeller of the pump, so that the fluid flow may be led more easily to the bearing assembly for its cooling and lubrication. One may also accommodate the forces which act on the impeller, so close to their point of engagement, that the bending moments acting on the rotor shaft may be reduced. Furthermore, the axial end which faces the drive device may be kept free of mountings, so that here, the drive means may be optimised in its design. It is no longer necessary to provide an additional mounting for the rotor shaft in the drive device, for example in the inside of the canned motor, or in a magnetic coupling. By way of this, in the case of a canned motor, it is also possible to design the can less stiffly, since the can does not need to transmit any bearing forces.

For example, the bearing ring of carbide or ceramic may for example be manufactured of silicon carbide (SiC). The bearing ring may be connected to the rotor shaft and rotate together with this. The outer peripheral surface of the bearing ring then forms the radial bearing surface. According to a preferred embodiment of the present invention, it is however the case that the bearing ring is arranged in a fixed manner, and the inner periphery of the bearing ring forces the radial bearing surface. This means that in this case, the bearing ring is fixed in a stationary manner in the bearing assembly, i.e. for example in the bearing housing and thus the pump assembly. The rotor shaft rotates in the central recess of the bearing ring, wherein the inner peripheral area of the bearing ring forms the radial bearing surface on which the rotor shaft is guided in a preferably sliding manner.

For this, a radial bearing element is preferably arranged on the rotor shaft in a rotationally fixed manner, and is slidingly in contact with the radial bearing surface of the bearing ring. The radial bearing element forms the bearing surface which corresponds to the inner peripheral surface of the bearing ring and which, with the inner peripheral surface of the bearing ring, forms a sliding bearing. The radial bearing element thereby may be designed as one piece with the rotor shaft. This means that the required bearing surfaces are designed as one piece in the rotor shaft. Preferably however, a radial bearing element of a suitable bearing material is connected to the rotor shaft. The radial element is particularly preferably a bearing ring which is pushed onto the rotor shaft and is in engagement with this with a non-positive fit and/or positive fit. The outer peripheral surface of this bearing ring of a suitable bearing material forms the bearing surface, which comes to slidingly bear on the inner peripheral surface of the bearing ring. Individual bearing elements could also be arranged preferably uniformly distributed around the periphery of the bearing shaft, for example by way of them being inserted into suitable recesses on the bearing shaft, instead of a continuous bearing ring. The radial bearing element which is arranged on the rotor shaft in a rotationally fixed manner, is manufactured of a suitable bearing material, for example of carbide or ceramic, e.g. silicon carbide.

Further preferably, a thrust bearing element is arranged on the rotor shaft, and is in sliding contact with one of the axial bearing surfaces of the bearing ring. This thrust bearing element transmits the pressure forces produced by the impeller on operation of the pump, from the rotor shaft onto the bearing ring. The thrust bearing element thereby with one of the axial bearing surfaces of the bearing ring preferably forms a sliding bearing. The thrust bearing element too may be designed as one piece with the rotor shaft, or be a component which is connected to the rotor shaft such that axial forces may be transmitted from the rotor shaft onto the thrust bearing element. The thrust bearing element preferably comprises bearing surfaces which are slidingly in contact with the axial bearing surfaces of the bearing ring. The bearing surfaces of the thrust bearing element are manufactured of a suitable material, for example carbide or ceramic, e.g. silicon carbide. For this, bearing components of this material may be inserted into corresponding receivers. These bearing materials however may also be deposited onto suitable carrier elements in the form of coatings.

The thrust bearing element particularly preferably comprises an annular bearing carrier, which is connected to the rotor shaft and in which several bearing pads distributed over the periphery are arranged, which are in contact with the axial bearing surface of the bearing ring. These bearing pads thereby are manufactured of the previously described suitable bearing material and are arranged in suitable receivers in the bearing carrier, so that together with the bearing carrier, they rotate with the rotor shaft. The bearing carrier is connected to the rotor shaft with a non-positive and/or positive fit, so that it rotates with the rotor shaft, and axial forces may be transmitted from the rotor shaft onto the axial bearing surface of the bearing ring.

According to a preferred embodiment of the present invention, an emergency bearing element is arranged on the rotor shaft, and this element comprises a bearing surface which faces one of the axial bearing surfaces of the bearing ring. This bearing surface comes into sliding contact with the oppositely lying axial bearing surface of the bearing ring, and thus forms a sliding bearing. This emergency bearing thus formed, acts in the axial direction and may accommodate axial forces which on starting operation of the pump assembly, act in the direction of the load which is opposite to the direction of the axial load which is usual on operation, and may accommodate axial forces arising in the opposite direction. The axial forces occurring in normal operation are transmitted by the above-described thrust bearing which accordingly is preferably dimensioned greater than the emergency bearing element. The emergency bearing element may likewise be manufactured of a carbide or ceramic, as described above. However, here one may also apply other materials such as a combination of graphite and polytetraflourethylene (PTFE). Such a material has good dry-running characteristics which is particularly important on starting operation of the pump, since there is still not yet an adequate lubrication of the bearing surfaces in this condition. The described emergency bearing may be simultaneously designed as a radial emergency bearing. For this, the emergency bearing element which is connected to the rotor shaft, is designed such that it comes to slidingly bear on a cylindrical bearing surface, for example in the bearing housing. Thus, an emergency mounting may be made available in the case that the actual radial mounting, which was described above, should become damaged. The emergency bearing element is connected to the rotor shaft preferably with a non-positive fit and/or positive fit, so that it may transmit axial forces in at least one direction onto the oppositely lying axial surface of the bearing ring, and may co-rotate with the rotor shaft.

Preferably, a bearing surface of the thrust bearing element and the bearing surface of the emergency bearing element face one another or are distant to one another. In the case that a bearing ring is provided as a stationary component, the bearing surface of the thrust bearing element and the bearing surface of the emergency bearing element face one another, so that they come to bear on the opposite end-sides of the bearing ring. When the bearing ring rotates with the rotor shaft, the bearing surface of the thrust bearing element and the bearing surface of the emergency bearing element may be formed by the oppositely directed end-sides, i.e. the end-sides of the bearing ring which are distanced to one another, which come to bear on oppositely lying axial bearing surfaces in the bearing housing. The embodiment with which the bearing ring is arranged in a fixed manner is, however, preferred. With this design, the two axial end-sides of the bearing ring as well as the inner peripheral surface then serve as bearing surfaces, so that the axial bearings for both axial directions as well as the radial bearing may be unified on one component, by which means the cooling, lubrication and assembly of the bearing are simplified.

The emergency bearing element is preferably designed in an annular manner and the inner periphery or the outer periphery of this emergency bearing element forms a radial bearing for the rotor shaft. Thus, the emergency bearing element may mount the rotor shaft in the radial direction in the case of damage to the above mentioned radial bearing. Thereby, the emergency bearing is preferably designed such that in normal operation, the forces arising in the radial direction are accommodated by the radial bearing described above, and not by the emergency bearing.

A material with a low friction, for example, PTFE, is applied for the emergency bearing element. In particular, a material with good dry-running characteristics is selected, in order, in the case of emergency, to be able to ensure a mounting without adequate lubrication.

Further preferably, the emergency bearing element has a larger thermal coefficient of expansion than the radial bearing described above, which is formed by the bearing ring. This permits a design with which the emergency bearing in normal operation transmits essentially no forces onto a corresponding bearing surface. Only on heating does the emergency bearing expand to such an extent, that it comes into sliding contact with a corresponding bearing surface in a manner such that it may assume the desired bearing function. One may thus prevent damage to the radial bearing which is formed by the bearing ring, on overheating of the bearing assembly, as may occur particularly with a dry-running. In this case, the emergency bearing element assumes the radial mounting on account of the thermal expansion.

The bearing ring is preferably fixed in a bearing housing by way of a clamping ring. The clamping ring thereby is preferably formed by a spring ring, which effects a fixation of the bearing ring in the bearing housing with a non-positive fit. Thereby, the clamping ring or spring ring permits a certain relative movement between the bearing ring and the bearing housing on account of its elasticity. In particular, it ensures that the bearing ring and the bearing housing are held in a firm engagement, even if both change in their size on account of heating or cooling. This is particularly advantageous, since the bearing ring and the bearing housing may have different coefficients of expansion. Thus, the bearing housing is manufactured of steel, for example, and the bearing ring for example of SiC, which have different thermal coefficients of expansion. The clamping ring is preferably arranged such that it surrounds the bearing ring at its outer periphery, and is clamped in between the outer periphery of the bearing ring and a cylindrical inner wall of a bearing housing surrounding the bearing ring.

According to a further preferred embodiment of the present invention, the bearing housing in the pump assembly may be positioned or adjusted in the axial direction. The axial direction thereby is the direction of the rotation axis of the rotor shaft. The positioning may, for example, be effected via spacer elements, which are inserted between the bearing housing and the contact surfaces for the bearing housing, in the pump housing. Setting screws may, for example, be provided as an alternative. The complete bearing arrangement, i.e. the axial bearing and radial bearing together with the rotor shaft, may be positioned in the axial direction by way of the axial positioning of the bearing housing, so that tolerances may be compensated, in order to position the rotor shaft in a defined manner with respect to a drive device, for example a magnet coupling, in the inside of the pump housing. The positioning is then subsequently retained. Preferably, the inner part of the magnet coupling or the rotor of an electric motor and the impellers of the pump are firmly connected to the rotor shaft. Therefore, these elements may be positioned together with the rotor shaft in the axial direction by way of positioning the bearing housing.

Further preferably, axial passages for the fluid to be delivered by the pump assembly are formed in the bearing housing. This is particularly advantageous if the bearing assembly is arranged in the axial direction between the impeller of the pump and the drive device. It is, therefore, rendered possible for the fluid to flow out of the region of the impeller through the bearing housing, in order here, on the one hand to lubricate the bearing surfaces in the bearing housing and to cool them, and on the other hand to permit the passage of fluid to the drive device, in order there to also cool the drive device itself.

Axially running channels or grooves, through which the fluid may flow in the inside of the bearing along the rotor shaft are preferably provided in the rotor shaft, in order to permit a fluid passage through the described radial bearing and axial bearing.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is hereinafter described by way of example and by way of the attached figures. There are shown in the drawings.

DETAILED DESCRIPTION OF THE INVENTION

Certain terminology is used in the following description for convenience only and is not limiting. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Figure 1:
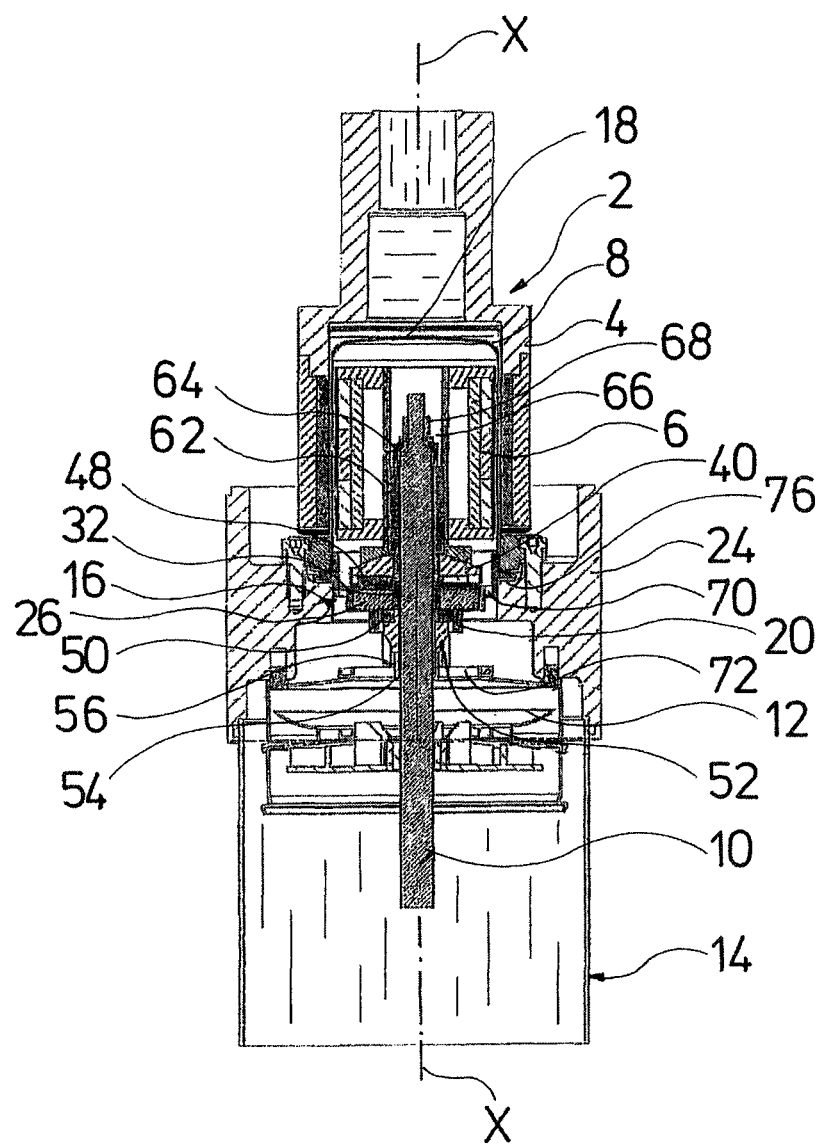
FIG. 1 is a schematic cross-sectional elevation view of a pump assembly according to a preferred embodiment of the invention.
Figure 2:
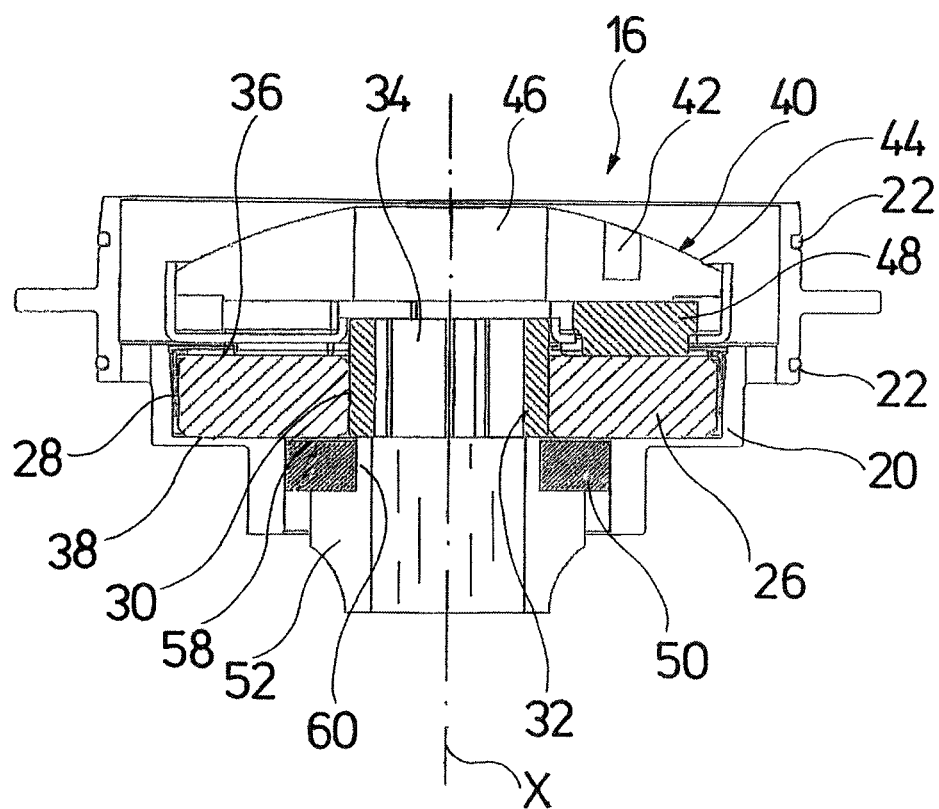
FIG. 2 is a cross-sectional elevation view of a bearing assembly of the pump assembly according to FIG. 1.
Figure 3:
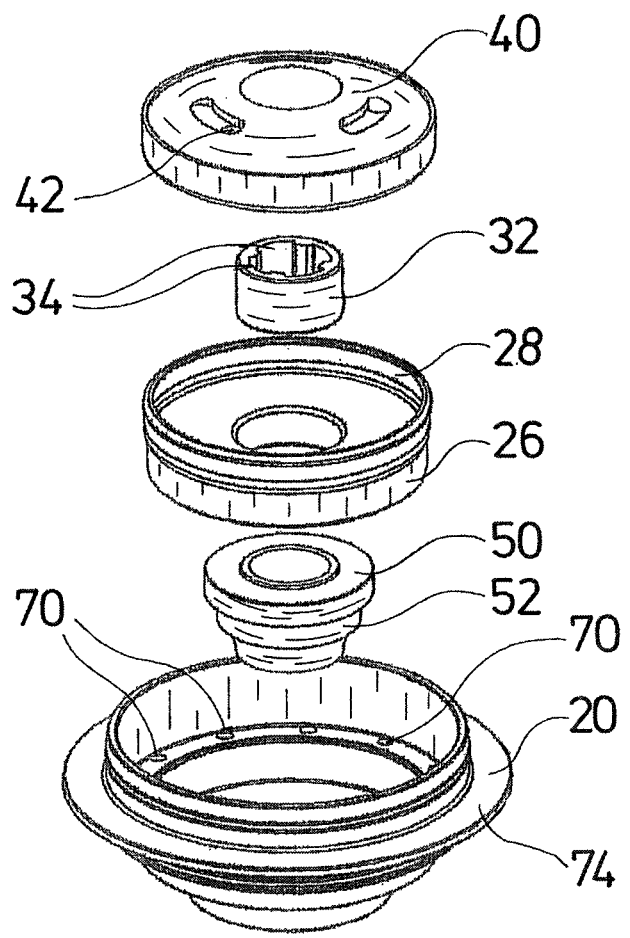
FIG. 3 is an exploded perspective view of the bearing assembly according to FIG. 2.

Referring to the drawings in detail, wherein like numerals indicate like elements throughout the several views, FIGS. 1-3 show a pump assembly according to a preferred embodiment of the present invention. The pump assembly preferably comprises a drive device 2 in the form of a magnet coupling. The magnet coupling preferably comprises an outer part 4 as well as an inner part 6, between which a can or a canned pot 8 is arranged. The outer part 4 is connected to a drive motor in a manner which is not shown here, so that it may be rotatingly driven about the longitudinal axis X. The rotational movement is transmitted by magnets through the can 8 onto the inner part 6, which rotates accordingly about the longitudinal axis X. The inner part 6 is preferably connected to the rotor shaft 10 in a rotational fixed manner, and this shaft drives the impellers 12 in the pump part 14 of the pump assembly. In the shown example, only one impeller 12 is shown, but it is to be understood, however, that the pump may be designed in a multi-stage manner, and several impellers 12 arranged one after the other in an axial manner, i.e. in the direction of the longitudinal axis X, may be accordingly fastened on the rotor shaft 10.

What is essential to the present invention is that the rotor shaft 10 is mounted in a central bearing assembly 16. The bearing assembly 16 groups together the radial bearing and axial bearing, and is arranged in the axial direction, i.e. in the direction of the longitudinal axis X, between the drive device 2 and the impeller 12. What is advantageous with this arrangement is in particular the fact that one does not need to provide any bearing for the rotor shaft 10 in the vicinity of the base 18 of the canned pot 8. The bearings of the bearing assembly 16 are all situated close to the pump part 14 and may thus be easily supplied with the fluid to be delivered, for cooling and lubrication. Furthermore, the grouping together of the various bearings into a bearing assembly permits a simple assembly and adjustment of the bearings and the rotor shaft 10 in the inside of the pump assembly. Thus, also the rotor shaft 10 is positioned in the axial direction in a defined manner by way of the positioning of the bearing assembly 16, so that the inner part 6 of the drive device is held in a defined axial position to the outer part 4 for an optimal efficiency of the drive.

FIG. 2 is particularly referred to with regard to the exact construction of the bearing assembly 16. The complete bearing assembly 16 is preferably arranged in a bearing housing 20. The bearing housing 20 is manufactured of a suitable material, for example metal or plastic, preferably as a cast part. The bearing housing 20 is designed essentially rotationally symmetrical to the longitudinal axis X. The bearing housing 20 on its outer periphery preferably comprises two grooves 22 with O-rings arranged therein. The bearing housing 20 may be inserted into the pump housing 24 in a fluid-tight manner by way of these O-rings, so that fluid to be delivered may not flow along the outer periphery of the bearing housing 20.

A central bearing ring 26 is preferably arranged in the bearing housing 20. This is manufactured of ceramic, in particular silicon carbide, and forms the required stationary radial bearing surfaces and axial bearing surfaces. The bearing ring 26 is inserted into a cylindrical receiver in the bearing housing 20, and there is fixed by a clamping ring 28 designed as a spring ring. The clamping ring 28 bears between the outer periphery of the bearing ring 26 and the cylindrical inner wall of the bearing housing 20, and is designed resiliently in the radial direction with respect to the longitudinal axis X, in a manner such that it exerts a pressure force radially inwardly onto the bearing ring 28, and radially outwards onto the inner wall of the bearing housing 20. The bearing ring 26 is held in the bearing housing 20 with a non-positive fit in this manner.

The bearing ring 26 forms a radial bearing surface 30 on its inner periphery. A radial bearing element 32 which is attached to the rotor shaft 10 in a rotationally fixed manner, cooperates with the radial bearing surface 30. The radial bearing element 32 is designed in an annular manner with a circularly cylindrical outer surface which comes to slidingly bear on the radial bearing surface 30. The radial bearing element 32 on the inner periphery comprises grooves 34 which extend in the axial direction and into which corresponding projections on the outer periphery of the rotor shaft 10, which project in the axial direction, engage, so that the bearing element 32 rotates together with the rotor shaft 10. The bearing element 32 too is manufactured of a suitable bearing material, in particular of a carbide or ceramic, for example silicon carbide. The outer peripheral surface of the radial bearing element 32, with the inner peripheral surface of the bearing ring 26, forms a sliding bearing.

The two end-faces 36 and 38 of the bearing ring 26 which are distant to one another form the stationary axial bearing surfaces for the axial mounting of the rotor shaft 10. Thereby, the end-face 36 is that axial bearing surface which must accommodate the main thrust load on operation of the pump assembly. A thrust bearing element 40 is preferably provided for transmitting this thrust force from the rotor shaft onto the axial bearing surface 36, and this element is connected to the rotor shaft 10 or the inner part 6 of the drive device 2 in a rotationally fixed manner. For this, catch pins (not shown), which are preferably connected to the inner part 6 of the drive device 2, engage into the holes 42 of a bearing carrier 44 of the thrust bearing element 40. The bearing carrier 44 preferably comprises a central recess 46 through which the rotor shaft 10 extends. In the shown example, the thrust bearing element 40 has no continuous axial bearing surface which is in sliding contact with the end-face 36 of the bearing ring 26. Rather, individual bearing pads 48 are arranged uniformly distributed over the periphery in the bearing carrier 44. These bearing pads 48 do not form a continuous ring, but individual bearing surfaces which are distanced to one another in the peripheral direction, so that passages exist between the bearing pads 48 in the radial direction. It is, however, alternatively also conceivable to arrange a continuous bearing ring, in which for example grooves for the fluid passage may be formed. The bearing pads 48 slidingly bear on the end-face 36 of the bearing ring 26, and with this form an axial sliding bearing, which as a thrust bearing accommodates the axial forces occurring on operation of the pump. The bearing pads 48 are manufactured of a suitable bearing material, for example carbide or ceramic, for example silicon carbide.

The axial end-face 38, at the opposite end-side of the bearing ring 26, forms a further axial bearing surface which is part of an emergency bearing. The emergency bearing preferably comprises an annular bearing element 50 which is held in a bearing carrier 52. The bearing carrier 52 is supported on the rotor shaft 10 in the axial direction. For this, the bearing carrier 52 is supported on a securing ring 54 which is fastened on the rotor shaft 10, wherein in the shown example, a spacer sleeve 56 is yet arranged between the bearing carrier 52 and the securing ring 54. In this manner, axial forces may be transmitted from the rotor shaft 10 in a direction opposite to the axial force occurring on operation, which is transmitted via the thrust bearing element 40 onto the bearing ring 26, onto the bearing carrier 52 and the bearing element 50. The annular bearing element 50 with its axial end-side 58 comes to slidingly bear one the end-face 38 of the bearing ring 26, and there, forms an axial sliding bearing. This axial sliding bearing may be dimensioned smaller and more weakly than the axial bearing formed by the thrust bearing element 40 and the end-face 36 of the bearing ring 26, since significantly smaller axial forces occur on the emergency bearing. No thrust forces whatsoever occur in this direction with normal operation of the pump, so that the bearing element 50 does not need to transmit axial forces onto the end-face 38. Only on starting operation of the pump is it possible for axial forces to occur in this direction, but these are low and disappear as soon as the pump delivers fluid. Furthermore, axial forces may occur in this direction in the case of fault.

The bearing element 50 is preferably manufactured of a bearing material with good dry-running characteristics, for example PTFE, with additions such as graphite, so that here too, an easy running is also ensured when fluid, which contributes to the lubrication, is not yet delivered. Furthermore, one may select a material such as PTFE, which may absorb fluid and thus ensure lubrication. The bearing element 50 furthermore, with its outer periphery, slidingly bears on a cylindrical inner wall of the bearing housing 20 and thus forms an emergency radial bearing for the case that the radial bearing element 32 should become damaged, and the radial forces may no longer be transmitted onto the bearing ring 26 as desired.

Preferably, a material with a large thermal coefficient of expansion, such as PTFE, is selected as a material for the bearing element 50. In particular, the coefficient of expansion may be larger than that of the materials from which the bearing ring 26 as well as the radial bearing element 32 are manufactured. By way of this, one succeeds in the bearing element 50 expanding given a heating, as may occur on dry running, and thus assumes the radial mounting of the shaft on the inner wall of the bearing housing 20. By way of this, the radial bearing between the bearing ring 26 and the radial bearing element 32 is relieved with dry-running, so that damage to this radial bearing is avoided.

The bearing element 50 is arranged on the bearing carrier 52 such that the bearing carrier 52 extends on the inner periphery of the annular bearing element 50 in the axial direction over a greater length than the bearing element 50 in the axial direction. In this manner, the bearing carrier 52 forms a spacer ring 60 in the inside of the bearing element 50, and this spacer ring bears with its end-side on the radial bearing element 32. This ensures that the bearing element 50 is distanced to the end-face 38 of the bearing ring 26 in normal operation, when the bearing pads 48 bear on the axial bearing surface 36. It is only when axial forces should occur in the opposite direction that the rotor shaft 10 is slightly shifted in the axial direction, so that the bearing element 50 comes to bear on the end-face 38 for force transmission. Should the radial bearing 32 become damaged, the spacer ring 60 would no longer support itself on this radial bearing element 32. In this case of fault, the bearing element 50 would then come into sliding contact with the end-face 38 of the bearing ring 26. This is rendered possible due to the fact that the thrust bearing element 40 is resiliently supported on the rotor shaft 10 in the axial direction. In this case, thus the bearing element 50 and the bearing pads 48 would come to bear on the bearing ring 26 simultaneously. In such a case of defect, the friction in the bearing is increased, in particular also due to loose parts arising from damage. This would lead to a greater load moment and therefore a higher current in the drive motor, which could then be detected by a safety circuit in the motor control, in order to switch off the motor.

The thrust bearing element 46 is supported via spacer sleeves 62 and 64 and a spring ring 66 on a nut 68, which is screwed onto the axial face-end of the rotor shaft 10.

Holes 70 extending in the axial direction, i.e. parallel to the longitudinal axis X, are preferably provided in the bearing housing 20 for lubricating the bearing as well as for cooling the drive device 2. A multitude of holes 70 are arranged distributed over the periphery. The holes 70 form a passage from the pump outlet 72 to the inside of the canned pot 8. In this manner, delivered fluid flows through the holes 70 into the inside of the canned pot. There, it flows between the outer side of the inner part 6, and the inner wall of the canned pot 8 up to the base 18 of the canned pot, and thereby ensures a cooling of the drive device. It subsequently enters in the axial direction into the inside of the inner part 6 and flows along the rotor shaft 10 through the axially extending grooves in the outer periphery of the rotor shaft into the inside of the bearing housing 20. There, it may flow radially outwards between the thrust bearing element 40 and the end-face 36 of the bearing ring 26. This, in particular, is rendered possible by the free spaces between the bearing pads 48. In this manner, an adequate lubrication of the axial sliding bearing between the bearing pads 48 and the end-face 36 may be achieved. Simultaneously, the fluid may also flow on the inner side of the bearing ring 26, i.e. between the outer surface of the radial bearing element 32 and the radial bearing surface 30 of the bearing ring 26, in order to lubricate the radial bearing. From there, it then enters into the gap between the end-face 38 and the bearing element 50. The bearing element 50 may furthermore be supplied with fluid directly from the pump outlet 42, and thereby, the fluid enters into the gap between the inner periphery of the bearing housing 20 and the outer periphery of the bearing carrier 52, and there is received by the bearing element 50 which is preferably fluid absorbing.

All bearing elements for the radial and the axial mounting in the pump housing 24 are fixed via the bearing housing 20. This permits a simple alignment of the bearing elements and thus of the rotor shaft 10 in the inside of the pump housing 24 in the axial direction X. Thus, the bearing housing 20 comprises a radially outwardly extending projection or flange 74 via which the bearing housing 20 is supported or fixed in the pump housing 24 in the axial direction. The axial position of the bearing housing 20 with respect to the pump housing 24 and thus of the bearing ring 26 and of the rotor shaft 10 mounted in this, may be set by way of the arrangement of differently thick spacer elements or spacer disks 76 between the flange 74 and a bearing surface in the pump housing 24.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pump assembly comprising at least one impeller (12), a drive device (2), a rotatable rotor shaft (10), at least one axial bearing (36, 40) and a sole radial bearing (30, 32), wherein the axial bearing (36, 40) and the sole radial bearing (30, 32) are integrated into a common bearing assembly (16) supported at a central portion of the rotor shaft (10) in an axial direction (X) of the shaft, and wherein the bearing assembly (16) further comprises a bearing ring (26) having an inner peripheral surface or an outer peripheral surface that forms a radial bearing surface (30), and wherein both axial-side end-faces (36, 38) of the bearing ring (26) form axial bearing surfaces.

2. A pump assembly according to claim 1, wherein the bearing ring (26) is arranged in a bearing housing (20).

3. A pump assembly according to claim 2, wherein axial passages (70) for the fluid to be delivered by the pump assembly are formed in the bearing housing (20).

4. A pump assembly according to claim 1, wherein the bearing assembly (16) is arranged in an axial direction between the at least one impeller (12) and the drive device (2) of the pump assembly.

5. A pump assembly according to claim 1, wherein the bearing ring (26) is arranged in a fixed manner, and an inner periphery of the bearing ring (26) forms the radial bearing surface (30).

6. A pump assembly according to claim 5, wherein a radial bearing element (32) is arranged on the rotor shaft (10) in a rotational fixed manner and is slidingly in contact with the radial bearing surface (30) of the bearing ring (26).

7. A pump assembly according to claim 5, wherein a thrust bearing element (40) is arranged on the rotor shaft (10) and is in sliding contact with one of the axial bearing surfaces (36) of the bearing ring (26).

8. A pump assembly according to claim 7, wherein the thrust bearing element (40) comprises an annular bearing carrier (44), which is connected to the rotor shaft (10), and several bearing pads (48) are arranged over a periphery of the bearing carrier (44), which are in contact with the axial bearing surfaces (36) of the bearing ring (26).

9. A pump assembly according to claim 7, wherein an emergency bearing element (50) is arranged on the rotor shaft (10) and comprises a bearing surface which faces one of the axial bearing surfaces (38) of the bearing ring (26).

10. A pump assembly according to claim 9, wherein a bearing surface of the thrust bearing element (40) and the bearing surface of the emergency bearing element (50) face one another or are distant to one another.

11. A pump assembly according to claim 9, wherein the emergency bearing element (50) is designed in an annular manner, and an inner periphery or an outer periphery of the emergency bearing element (50) forms a radial bearing for the rotor shaft (10).

12. A pump assembly according to claim 11, wherein the emergency bearing element (50) has a greater thermal coefficient of expansion than the radial bearing (30, 32).

13. A pump assembly according to claim 1, wherein the bearing ring (26) is fixed in a bearing housing (20) by way of a clamping ring (28).

14. A pump assembly according to claim 13, wherein the bearing housing (20) is positionable in the pump assembly in the axial direction (X).

\* \* \* \* \*